United States Patent [19]
Taylor et al.

[11] 3,857,572
[45] Dec. 31, 1974

[54] E-RING SEAL ASSEMBLY

[75] Inventors: Dudley D. Taylor, Beltsville; Horace P. Halling, Laurel, both of Md.

[73] Assignee: Pressure Science, Inc., Beltsville, Md.

[22] Filed: Oct. 18, 1973

[21] Appl. No.: 407,653

[52] U.S. Cl.................... 277/9.5, 277/11, 277/180, 277/206 R
[51] Int. Cl............................................ F16j 15/00
[58] Field of Search ............ 277/9.5, 11, 180, 188, 277/198, 206, 213–215

[56] References Cited
UNITED STATES PATENTS

| | | | |
|---|---|---|---|
| 2,339,479 | 1/1944 | McCreary | 277/180 |
| 2,442,312 | 5/1948 | Price | 277/11 |
| 2,462,762 | 2/1949 | Nardin | 277/11 |
| 2,474,790 | 6/1949 | Rossman | 277/11 |
| 3,285,632 | 11/1966 | Dunkle | 277/11 |
| 3,595,588 | 7/1971 | Rode | 277/235 R |
| 3,633,928 | 1/1972 | Smith | 277/206 R |
| 3,704,021 | 11/1972 | Barbarin | 277/180 |
| 3,761,102 | 9/1973 | Nickolson | 277/206 R |
| 3,797,836 | 3/1974 | Halling | 277/206 R |

Primary Examiner—Harry N. Haroian
Assistant Examiner—Robert I. Smith
Attorney, Agent, or Firm—Roylance, Abrams, Berdo & Kaul

[57] ABSTRACT

There is disclosed a sealing ring assembly comprising one or more resilient metal sealing rings approximately E-shaped in radial cross section each secured inside a spacer plate. The outer arms of the sealing ring have a sinuous configuration. The central arm of the E is a loop, open on the outer edge and has at least a portion of its two sides out of contact with each other. An outer spacer plate encircles each of the E rings. This plate contains an annular groove in each of the inner surfaces of the apertures provided for the E-seals. This groove is aligned with and coextensive with the opening of the loop in the E-ring. A split ring encircles the E-ring seals and is situated so that a portion thereof extends into the annular groove on the metal spacer plate and another portion extends into the opening in the loop in the E-ring seal. This ring thereby prevents the E-ring from falling out of the spacer plate during handling and installation. This assembly is inserted as a unit between two flat faced flanges secured to the ends of tubing of equipment which is to be coupled.

7 Claims, 4 Drawing Figures

PATENTED DEC 31 1974 3,857,572

E-RING SEAL ASSEMBLY

This invention relates to a novel sealing ring combination and, more particularly, to a sealing ring and spacer assembly which may be inserted as a preassembled unit between pipe flanges having flat faces.

As known in the art, there are many applications, such as hydraulic and pneumatic piping systems in aircraft, missiles and the like, wherein it is particularly desirable or essential to make pipe connections or fittings with lightweight components which are absolutely reliable. Sealing rings designed for such systems, i.e., those wherein the weight of the components to be sealed is minimized, must be sufficiently flexible to follow the large deflections in the sealing surfaces and thereby maintain contact between the seal and the sealing surfaces of the flanges. Such flexible seals, unlike gaskets which are simply compressed between flat flanges, require a sealing cavity to limit the compression forces applied to the seal, thereby preventing the seal from being overstressed and losing its flexibility at installation.

U.S. Pat. No. 3,192,690 discloses a sealing ring of approximate E-shape in radial cross section, the upper and lower arms of the E being smoothly sinuous and the back of the E being broken by a central loop or convolution which forms the short horizontal central arm of the E. U.S. Pat. No. 3,575,432 discloses an improvement over the sealing ring in U.S. Pat. No. 3,192,690. This patent relates to a metal sealing ring of approximate E-shape in radial cross section, the outer arms of the E having a sinuous configuration and being from about 1.5 to 3.5 times as long as the middle arm of the E. The E seals of these patents are used to seal the flanges on tube joints and other equipment by placing them in a cavity defined by a pair of relatively movable flange members attached to the ends of the tube. Commonly, the annular cavity in which the E-ring is placed is defined by two flanges, one containing an annular recess in the face thereof and the other having a flat face. The compression of the E-ring seal at installation is limited by the depth of such recess. Alternatively, the annular cavity may be defined by flange members each having a flat surface, a spacer plate being placed between the flat faces, such plate having holes for E-ring seals to be placed therein. This latter arrangement of flanges and spacer plate has certain advantages over the annular recessed flange since it eliminates the necessity for machining a groove in the face of one of the flanges; a particularly difficult task in view of the need for an exceedingly smooth, flat surface, free of machining marks, in the bottom of the recess so as to provide for adequate sealing. Such surfaces are readily generated on flat flanges. However, since the spacer plate and the E-ring seal are separate components, difficulty is experienced in installing them between the flat faces of the two flanges, particularly if a multiplicity of seals are required. Thus, the E-ring seals must first be placed on the flanges and the spacer plate is placed over the seals and care must then be taken so that the E-ring or rings do not fall off of the flanges before they are bolted together or otherwise secured. Such procedure would frequently be performed in relatively inaccessible locations around equipment during maintenance or service.

Thus, a reliable and positive means of securing the E-seals to the spacer plate is needed. Such means, however, must still permit the E-seal to "float" or move laterally with respect to the spacer plate so as to enable the E-seal to follow the pressure and temperature deflections of the flanges. Welding or staking the E-seals to the spacer plate would not permit this movement.

U.S. Pat. No. 3,704,021 discloses a seal assembly for pipe couplings utilizing concentric rings. The seal assembly comprises an inner ring of plastic material and an elastomeric O-ring mounted therein. An outer ring of plastic material is mounted on the elastomeric O-ring. The edge of the plastic ring which is in contact with the elastomeric O-ring is concave or V-shaped. A rigid metal ring encircles the outer plastic ring.

It is an object of this invention to provide a means for positively affixing one or more E-sealing rings within a spacer plate in such manner as to enable the E-seal to float with respect to the spacer plate so as to permit sealing under conditions of flange deflection.

It is a further object of this invention to provide an E-sealing ring spacer plate assembly which is preassembled and which may be inserted as a unit between two flanges on section of tubing or in other equipment.

It is another object of this invention to provide such a combination which is of simpler construction than any preassembled sealing ring combination heretofore known.

It is yet another object of this invention to provide a means for positive visual assurance that E-seals are in their proper places after flanges have been bolted together even though the E-seals are not themselves visible.

These and other objects are attained by the practice of this invention which, briefly, comprises providing a sealing assembly comprising one or more resilient metal sealing rings approximately E-shaped in radial cross section secured inside a spacer plate. The outer arms of the E-sealing ring have a sinuous configuration. The central arm of the E is a loop, open on the outer edge and having at least a portion of its two sides out of contact with each other. An outer spacer plate has an aperture for each E-ring that will be affixed thereto. Such apertures each contain an annular groove on the inner surface thereof. Such groove is aligned with and coextensive with the opening of the loop in the E-ring. A ring encircles the E-ring and is situated so that a portion thereof extends into the annular groove on the spacer plate and another portion extends into the opening in the loop in the E-ring. Thus, this ring prevents the E-ring from falling out of the spacer plate during handling and installation. This assembly is inserted as a unit between two flat faced flanges secured to the ends of tubing or on other equipment which is to be coupled to provide a leak tight joint.

The invention will be more fully described by reference to the drawings wherein.

Figure 4:
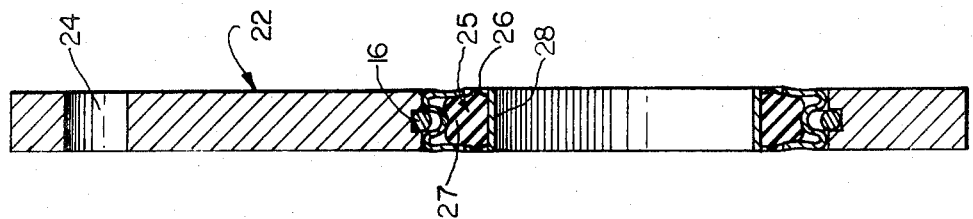
FIG. 4 is a cross-sectional view of FIG. 3 taken along line 4—4.

Referring to the drawings in detail, the metallic sealing ring 10 comprises an integral piece of resilient metal approximately E-shaped in radial cross section. The outer arms 11 of the E have a sinuous configuration. The central arm of the E is a loop having its two sides 12 out of contact with each other. The sides of the loop are interconnected at the inner end of the central arm by a 180° bend. There is an opening between the outermost portions of the sides of the loop which define the central arm of the E. Such rings are described in detail in U.S. Pat. Nos. 3,192,690 and 3,575,432, the disclosures of which are incorporated herein by reference. Such seals, especially those having multiple convolutions on each outer leg thereof, have the advantage of being quite resilient, thereby lowering the amount of squeeze force which needs to be exerted through tightening of the bolts which hold together the flanges between which the seal assembly is inserted.

A spacer plate 13 contains an aperture 14 for the E-ring 10 and has bores 17 for bolts to pass through. This spacer plate contains an annular groove 15 on the inner surface of the aperture 14 which is aligned with and coextensive with the opening in the upper portion of the loop on the E-seal.

A split wire ring 16 is situated so that it is partially in the groove 15 of the spacer plate 13 and partially in the loop of the E-seal 10. The diameter of the wire of this ring is substantially smaller than the distance between the two sides 12 of the central loop of the E-seal. The split wire ring is stretched over the E-seal and compressed into the loop of the E-seal and these two parts are then placed into the aperture 14 of the spacer plate 13. When these parts are properly aligned, the split wire ring 16 then expands into the groove 15 of the spacer plate. This ring then permanently affixes the E-seal to the spacer plate yet permits the E-seal to float laterally because the diameter of the wire used to make the wire ring 16 is substantially smaller than the space between the two sides 12 of the E-seal loop.

Figure 2:
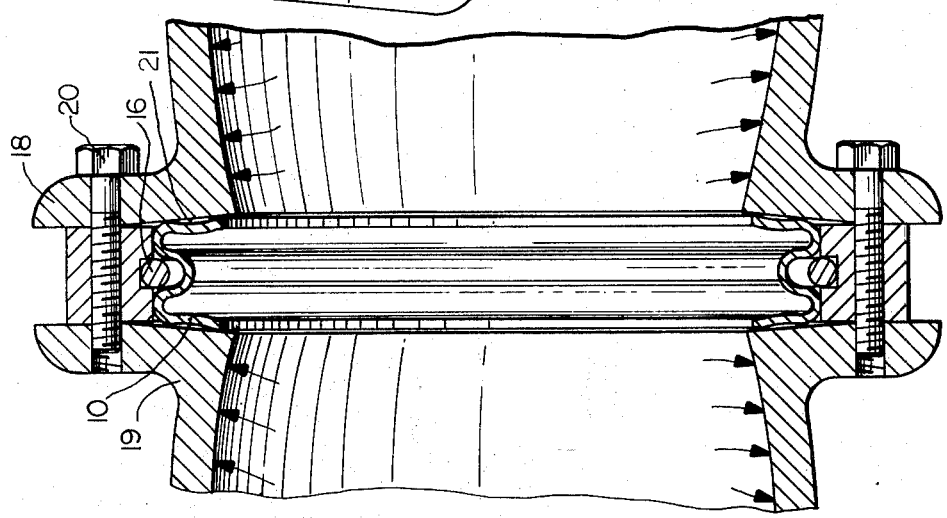
FIG. 2 is a cross-sectional view of a cavity defined by a pair of relatively movable flange members, which cavity contains a sealing ring assembly of this invention.

FIG. 2 shows the sealing ring assembly of this invention installed between the flat faces of flanges. Thus, there is shown a fluid line coupling, i.e., for coupling flange members, such as tube sections in a fluid fuel line. The coupling assembly includes mating flanged members 18 and 19 which are secured by welding to the tube sections. The face of each flange is flat. The flanges 18 and 19 are coupled together by means of a bolt 20 which engages threads in the flange 19 (not shown). The bolt 20 passes through the bore 17 in the spacer plate 13. Alternatively, a V-flange coupling as described in U.S. Pat. No. 3,575,432 may be used or the flanges might be secured by a nut as in conventional tube fittings. The combination of the faces of the flanges 19 and 20 and the bottom portion of the spacer plate 13 form a cavity 21 in which is situated the E-ring 10. The outer arms 11 of the E-ring 10 are in sealing engagement with the faces of the flanges 18 and 19. Note that the pressure forces inside the tube in the direction of the arrows can cause the flanges to distort as shown, but the E-seal continues to contact the flange faces since it is not immovably affixed to the spacer plate, but is affixed by the wire ring 16 so as to be able to float with respect to the plate.

The metallic sealing ring 10 may be constructed of any thin metal, e.g., stainless steel, and may be coated with various materials such as silver, lead, gold, indium, etc.

Figure 3:
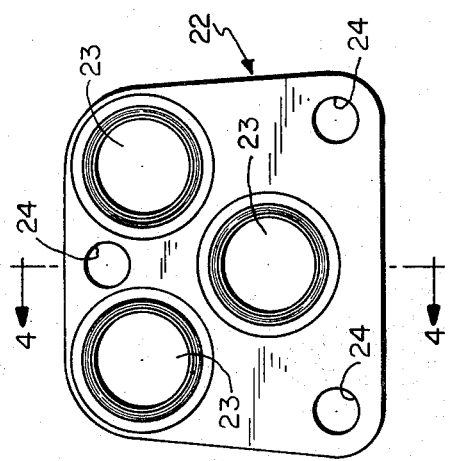
FIG. 3 is a plan view of a sealing ring assembly showing such assembly with 3 E-seals and shows an embodiment of the invention utilizing elastomeric elements.
Figure 1:
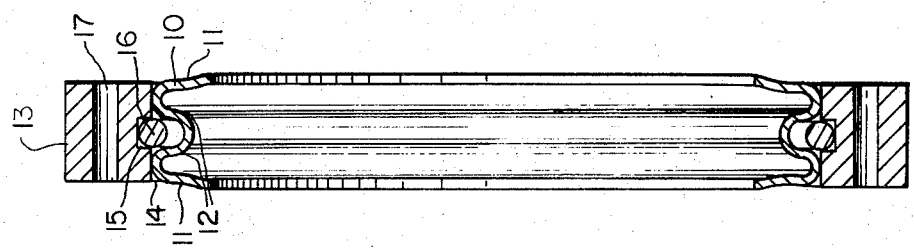
FIG. 1 is a cross-sectional view of a sealing ring assembly of this invention.

Referring to FIGS. 3 and 4, there is shown a spacer plate 22 which contains 3 apertures 23. The spacer plate 22 also contains 3 bores 24 for bolts to pass through to secure it between mating flanges. Each aperture 23 contains an E-ring 10 and a wire ring 16 as described with respect to FIG. 1. An elastomeric sealing ring 25 is also positioned in the aperture 23. This ring, which may be constructed of rubber or other elastomeric material, comprises a wider or sealing portion 26 having a thickness which is initially slightly larger than the width of the cavity into which the assembly is to be placed so that it will be compressed in the cavity to provide a substantially zero leakage seal, and a narrower portion 27 which has a thickness less than that of the sealing portion 26. The narrower portion 27 is situated between the two outer arms 11 of the E-ring 10. A separate metallic ring 28 is held adjacent to the inside of the diameter of the elastomeric ring 25 as by compression or bonding. Certain fluids have a tendency to attack elastomers and cause the elastomeric material to be eroded away. The metallic ring 28 serves to prevent this action by providing a metallic barrier between the fluid in the lines and the elastomeric ring 25. Under normal operating conditions, the primary seal in the embodiment shown in FIG. 4 is provided by the elastomeric ring 25, i.e., this ring provides a back up seal through metal to metal contact of the outer arms 11 with the sides of the cavity in which it is situated. While roughness or scratches on the sides of the cavity may cause the metal E-ring to be less than completely leakproof under extremely high pressures, this is of no consequence under normal conditions since the primary elastomeric seal 25 provides zero leakage and the secondary E-ring is not pressurized. However, when the joint is subjected to fire conditions, the elastomeric seal 25 initially undergoes expansion, e.g., up to 5 percent by volume. The presence of the metallic ring 28 confines the rubber and prevents expansion in the direction of the confined fluids, thereby causing the elastomer to expand in the direction of the E-ring 10. This results in a significant driving force energizing the E-ring 10 with a very high pressure, e.g., from 20,000 to 40,000 p.s.i. even though the pressure of the fluid in the line may only be 200–300 p.s.i. This pressure pushes the outer arms 11 of the E-ring 10 with sufficient force to seat the metal seal and coin the metal surface on the sides of the cavity, thus providing a no-leak metallic seal. Flammable fluid is thereby prevented from spraying out from between the flanges and feeding the fire. In the event of a fire, when fuel is flowing through the pipe, the inner metallic ring also prevents the disintegrating elastomeric compound from entering the fuel stream. It also prevents erosion of the elastomeric seal by the fuel flow during normal operation of the system.

Positive retention of the E-seals, and the assurance that they are in place after visual inspection of an assembled joint is particularly significant when considering fuel seals, since accidentally leaving out one seal can have disastrous consequences. Thus, an additional advantage of this invention is that it provides a means for positive visual assurance that the E-seals are in their proper places after flanges have been bolted together even though the E-seals are not themselves visible. After a mechanic installs the E-seals and bolts up the flanges, an inspector normally visually examines the joint. With the E-seals of the prior art, such examination will not reveal if, in fact, the E-seals are in place, since they can not be seen, and the mechanic may have inadvertently left one out of a recess cavity, or one may have been left off or fallen off of a flange if a spacer plate is being utilized. However, since the E-seals of this invention are permanently affixed to the spacer plate at the time of manufacture, there is positive assurance that they are in the proper place in the plate at all times, i.e., since the edge of the spacer plate 29 is visible between the flanges after bolt up (even though the seals are not) the visual inspection by the inspector of the installation gives proof that the seals are in fact in place.

The split wire ring 16 need not necessarily be circular either in plan form or in cross-section. Thus, for larger diameter, deeply convoluted E-seals, a split wire ring which is rectangular in cross-section may be used. Moreover, a wave or other pattern may be designed into the plan form of the ring.

We claim:

1. A sealing ring assembly comprising a spacer plate and at least one resilient metal sealing ring approximately E-shaped in radial cross section secured inside an aperture in said spacer plate, the outer arms of said E-sealing ring having a sinuous configuration, the central arm of said E-sealing ring being a loop open on the outer edge thereof and having at least a portion of its two sides out of contact with each other, the portion of said spacer plate defining said aperture encircling said E-sealing ring and having an annular groove on the inner surface thereof, said groove being aligned with the opening of the loop on the central arm of said E-sealing ring, another ring encircling said E-sealing ring and being situated so that a portion thereof extends into said annular groove and another portion thereof extends into the opening in the central arm of said E-sealing ring.

2. The sealing ring assembly as defined in claim 1 wherein said last mentioned ring is a split wire ring.

3. The sealing ring assembly as defined in claim 1 wherein the outer arms of said E-sealing ring at least partially surround a portion of an elastomeric sealing ring, a metallic ring being held adjacent to the inside surface of the elastomeric ring.

4. The sealing ring assembly as defined in claim 1 wherein said spacer plate contains one aperture and one E-sealing ring.

5. The sealing ring assembly as defined in claim 1 wherein said spacer plate contains a plurality of apertures, each containing an E-sealing ring.

6. The sealing ring assembly as defined in claim 1 and further including a pair of relatively moveable flange members which, in combination with said spacer plate define between them a cavity and means for urging the flange members into engagement.

7. The sealing ring assembly defined in claim 3 and further including a pair of relatively moveable flange members which, in combination with said retaining ring, define between them a cavity and means for urging the flange members into engagement.

* * * * *